United States Patent Office 2,910,748
Patented Nov. 3, 1959

2,910,748
PRODUCTION OF BINDERS FOR SAND CORES

Glen Porter Hamner, Baton Rouge, La., and Clellie Truman Steele, Sarnia, Ontario, Canada, assignors to Esso Research and Engineering Company, a corporation of Delaware No Drawing. Application March 11, 1957
Serial No. 644,996

12 Claims. (Cl. 22—193)

This invention relates to the production of binders for sand cores for metal castings and relates more particularly to a novel core oil composition and its method of preparation.

In the manufacture of cores for use in making metal castings, it is customary to mix sand with a binder, shape the core and then bake it. A vast number of materials have been suggested and tried as the binder in the preparation of such cores.

Among the materials which have been suggested is the polymer obtained by contacting with clay a highly olefinic hydrocarbon stream described below. Such a polymer (known as CTLA polymer) is prepared commercially in a clay treating unit which consists of a furnace having two individual circuits, one of which is used to preheat the feed and the other to supply heat to the fractionating tower which separates the polymer from light and heavy naphtha, and a drum charged with about 20 tons of 8 to 15 mesh Attapulgus clay. The highly olefinic feed stream consists of a mixture of depentanized distillate from an isoprene fractionator unit and debutanized bottoms from a steam cracking unit. It boils between about 50 to 500° F. and contains about 10 to 25% conjugated diolefins, 40 to 60% olefins, 20 to 40% aromatic and 2 to 5% paraffin hydrocarbons. The liquid feed stream is generally preheated to about 250° to 300° F. and passed downwardly through the clay drum. A temperature rise of about 30° to 50° F. occurs in the clay bed as a result of the exothermic reaction. The treated distillate leaving the clay drum is transferred to a fractionating tower which separates the polymer from light and heavy naphtha. A stripper in the bottom of the tower removes any light hydrocarbons that may be mixed with the polymer.

The polymer oil generally has a Staudinger molecular weight between about 200 and 1000 and a Wijs iodine number between about 240–320, preferably about 260. It has about 82 to 95% by weight non-volatile matter (ASTM–D–154–43) and an ash of about 0.3 to 0.4 wt. percent. The polymer's viscosity at 210° F. is usually about 100 to 300 seconds, and preferably about 156 seconds, in a Saybolt Universal viscometer. The maleic anhydride and Gardner Diene numbers are about 109 and 19, respectively. It boils between about 400° and 1000° F., having 5% and 95% points at about 500° and 910° F., respectively. The flash point is between about 190° and 300° F. Its API gravity at 60° F. is betwen about 6 and 14.

It has now been discovered that cores equally as good as those heretofore made can be obtained by using a binding agent which comprises a mixture of polymers of the dimers and codimers of cyclopentadiene, methylcyclopentadiene, higher alkylated cyclodienes and acyclic dienes together with drying oils such as soya bean, tall, fish, linseed, etc.

The mixtures of polymers of dimers and codimers which are mixed with the linseed oil to give the improved binder of this invention are obtained by cracking petroleum fractions such as kerosene, gas oil, naphtha, etc. in the presence of steam at temperatures above 1000° F. up to 1500° F. to give an unsaturated product stream. The liquid cut boiling between 80° and 350° F. is segregated and subjected to heat soaking at about 220° to 240° F. for 6–16 hours to dimerize the cyclic diolefins contained therein followed by separation of the undimerized material. The cyclodiene dimers and codimers are polymerized as such or diluted with some inert diluent, such as Varsol, hexane, Solvesso 150, toluene, etc. The bottoms from a cyclopentadiene purification unit, which consist essentially of the dimer of methylcyclopentadiene, can also be used as feed. The polymerization catalyst consists of clay or phosphoric acid. In the case of clay up to about 2 volumes of dimer per volume of catalyst is used and the polymerization is carried out at a temperature between 450° and 600° F. and a pressure of 170–200 p.s.i.g. and a contact time ranging from 10 minutes to two hours. When $H_3PO_4$ is used, the catalyst is present in an amount up to 2 volumes per volume of dimer, and the temperature ranges between 550° and 700° F. and pressures from 170 to 200 p.s.i.g. Contact times ranging from 10 minutes to two hours can be employed depending on catalyst concentration and temperature. Depending on the feed composition, polymerization conditions and stripping conditions, the product ranges from a semi-solid material to a hard resin having a softening point of about 212° F.

The polymer is mixed with linseed oil in the ratio of two parts of polymer to one of linseed oil. A suitable comminuted core material, such as sand, zirconia, alumina, fluid coke, or the like is mixed with the polymer-linseed oil mixture in suitable proportions, the polymer being in solution.

In the practice of the invention, about 100 parts of core sand and one part of a mixture of linseed oil and polymer solution containing about two parts of polymer and one of linseed oil (based on the non-volatile portion) are thereby mixed to form a molding composition. These proportions may be varied to suit conditions, however. The mixture is then formed into a core of desired shape and baked at a temperature of about 350°–450° F. to drive off the solvent and render the core hard and capable of resisting heat without fusion or softening. The length of time required for baking varies with the size of core, its shape and other conditions, and may vary from thirty minutes to several hours. Cores thus formed have greater cohesion, hardness and tensile strength than cores made with commercial binders formerly employed, e.g. linseed oil, and equally as good as linseed oil-CTLA polymer mixtures.

The following examples are given to illustrate but not to limit the invention.

*Example 1*

A mixture consisting approximately of the dimers and codimers made from a monomeric mixture consisting of 41 wt. percent cyclopentadiene, 34 wt. percent methylcyclopentadiene, 6 wt. percent of $C_7$ cyclodienes, and 5 wt. percent of $C_5$ acyclic dienes and obtained by the heat soaking at 220–240° F. of a steam-cracked stream boiling between 80° and 350° F. is divided into two portions. One was mixed with naphtha (boiling range 200°–240° F.) in a ratio of 80 parts dimer and 20 parts naphtha and polymerized with Attapulgus clay at 580° F. and 170–200 p.s.i.g. The other was diluted with naphtha and polymerized with $H_3PO_4$ adsorbed on Kieselguhr at 650° F. and 170–200 p.s.i.g. Each portion was passed over the catalyst at the rate of two volumes of dimers per volume of clay per hour. The reaction solution was then washed to remove catalyst residues and stripped to a non-volatile content of 85–90%.

These oils had the following properties:

| | (1) Clay Polymerized Dimers | (2) $H_3PO_4$ Polymerized Dimers |
|---|---|---|
| Gravity, °API | 5.2 | 6.0 |
| Viscosity, SSU/210 | 393 | 175 |
| Flash, °F | 290 | 260 |
| NVM, Wt. Percent | 87.1 | 88.3 |
| $I_2$ number, cg./g | 326 | 200 |

These polymer solutions were mixed with linseed oil in the weight proportions of ⅓ linseed oil and ⅔ polymer. A quantity of oil or mixture sufficient to give 1% NVM, based on sand, was kneaded with sand for two minutes. This mixture was then kneaded with 3% water for two minutes. It was then further mixed by rubbing between the hands for three minutes. Test cores were rammed and baked at 400° F.

Tensile strengths were determined on these cores after baking and compared with cores from CTLA polymers, made as described above, and containing 33⅓% by weight of linseed oil and with linseed oil alone. The following data were obtained:

| Core Oil | Tensile Strength At Indicated Baking Time (Mins.) | | |
|---|---|---|---|
| | 30 | 45 | 90 |
| CTLA polymer core oil plus linseed oil (2/1) | 70 | 100 | 286 |
| Clay polymerized oil | 65 | 46 | 59 |
| Clay polymerized oil plus linseed oil (2/1) | 64 | 123 | 293 |
| $H_3PO_4$ polymerized oil | 43 | 83 | 38 |
| $H_3PO_4$ polymerized oil plus linseed oil (2/1) | 0 | 65 | 288 |
| Linseed oil (alone) | 88 | | 296 |

The above results show that the mixture of linseed oil with the polymer obtained by clay or $H_3PO_4$ polymerization of mixtures of dimers from the thermal soaking of steam-cracked fractions boiling betwen 80° and 350° F. is an excellent binder for sand cores when compared with a CTLA polymer core oil and with linseed oil alone, the tensile strength in all cases being as good as the CTLA oil and when baked for 90 minutes at 400° F. far greater than the resin alone which is in fact a poor binder by itself.

The nature of the present invention having been thus fully set forth and specific examples of the same given, what is claimed as new and useful and desired to be secured by Letters Patent is:

1. A core coil which is adapted to be admixed with a comminuted refractory core body which comprises a mixture of 1 part by weight of a drying oil, 2 parts by weight of a polymer and a solvent for said polymer, said polymer being prepared by the following steps: (1) providing a steam-cracked petroleum fraction boiling between 80° and 350° F.; (2) heat soaking the steam-cracked fraction at 220°–240° F. to dimerize the cyclic dienes; (3) separating the undimerized materials from the dimerized cyclic dienes; and (4) polymerizing the dimerized cyclic dienes with a catalyst selected from the group consisting of clay and $H_3PO_4$.

2. A core oil according to claim 1 in which the catalyst is Attapulgus clay.

3. A core oil according to claim 1 in which the catalyst is phosphoric acid adsorbed on kieselguhr.

4. A composition for making foundry cores comprising a comminuted core body material suitable therefor and a binder consisting of a drying oil, a resinous polymerization product and a solvent for said resinous product, said resinous product being prepared by the following steps: (1) providing a steam-cracked petroleum fraction boiling between 80° and 350° F.; (2) heat soaking the steam-cracked fraction at 220°–240° F. to dimerize the cyclic dienes; (3) separating the undimerized materials from the dimerized cyclic dienes; and (4) polymerizing the dimerized cyclic dienes with a catalyst selected from the group consisting of clay and $H_3PO_4$.

5. A composition according to claim 4 in which the resinous product is prepared by clay polymerization.

6. A composition according to claim 4 in which the resinous product is prepared by phosphoric acid polymerization.

7. A composition according to claim 4 in which the drying oil is linseed oil.

8. A composition according to claim 7 in which the catalyst is clay.

9. A composition according to claim 7 in which the catalyst is phosphoric acid.

10. The process of making a metal casting core which consists in admixing sand with a mixture of linseed oil and a solution of a resinous polymerization product prepared by the following steps: (1) providing a steam-cracked petroleum fraction boiling betwen 80° and 350° F.; (2) heat soaking the steam-cracked fraction at 220°–240° F. to dimerize the cyclic dienes; (3) separating the undimerized materials from the dimerized cyclic dienes; and (4) polymerizing the dimerized cyclic dienes with a catalyst selected from the group consisting of clay and $H_3PO_4$.

11. The process according to claim 10 in which the catalyst is clay.

12. The process according to claim 10 in which the catalyst is phosphoric acid.

References Cited in the file of this patent

UNITED STATES PATENTS

| | | |
|---|---|---|
| 2,102,074 | Iptieff | Dec. 14, 1937 |
| 2,468,956 | Burg | May 3, 1949 |
| 2,659,654 | Tuttle | Nov. 17, 1953 |
| 2,753,326 | Hamner | July 3, 1956 |
| 2,765,507 | Wolf | Oct. 9, 1956 |
| 2,779,750 | Fuqua et al. | Jan. 29, 1957 |